United States Patent [19]

Waldner

[11] Patent Number: 5,146,872
[45] Date of Patent: Sep. 15, 1992

[54] ANIMAL-ACTUATED FEED-DISPENSING APPARATUS

[75] Inventor: Larry L. Waldner, Raymond, S. Dak.

[73] Assignee: Clark Hutterian Brethren, Inc., Raymond, S. Dak.

[21] Appl. No.: 726,330

[22] Filed: Jul. 5, 1991

[51] Int. Cl.$^5$ .................................. A01K 1/10
[52] U.S. Cl. ........................................... 119/54
[58] Field of Search .............. 119/52.1, 54, 56.1, 119/51.01, 51.04, 51.11, 53.5

[56] References Cited

U.S. PATENT DOCUMENTS

| | | | |
|---|---|---|---|
| 1,380,564 | 6/1921 | Kennedy | 119/54 |
| 4,235,200 | 11/1980 | Shay | 119/56 X |
| 4,522,152 | 6/1985 | Meyer | 119/56.1 |
| 4,825,811 | 5/1989 | O'Kelley | 119/54 X |
| 4,895,109 | 1/1990 | De Groot et al. | 119/54 X |
| 4,987,858 | 1/1991 | Curtis et al. | |
| 5,036,798 | 8/1991 | King | 119/54 X |

Primary Examiner—Paul J. Hirsch
Assistant Examiner—Thomas Price
Attorney, Agent, or Firm—Moore & Hansen

[57] ABSTRACT

An animal-actuated feed-dispensing apparatus is provided by the present invention. The invention includes a feed storage bin having a dispensing opening closed by a swingable gate that is swingable between open and closed positions. The gate has first and second diverging members therefor defining therebetween a feed charge chamber that receives feed from the storage bin when said gate is swung open, the feed being dispensed from the charge chamber into an animal feeding area when said gate swings from the open to the closed position. The gate is actuated by the engagement of the second member by the animal.

10 Claims, 2 Drawing Sheets

ANIMAL-ACTUATED FEED-DISPENSING APPARATUS

BACKGROUND OF THE PRESENT INVENTION

Animal actuated feed dispensing animal feeders or animal self-feeders are long known in the art. All have a mechanism of some kind actuated by the animal that dispenses feed from a storage bin. With some animals, such as hogs, it is preferred that the amount of food dispensed be limited since it is often wasted if dispensed in volume. Thus, hog self feeders are known where feed is dispensed in limited quantities by side to side movement of a lever that interacts with feed in bins to knock feed into and through a narrow slot into a feed trough. This system relies on the feed to bridge the narrow slot and not simply fall through when not agitated by the lever. It is thus unusable for certain kinds of particularly finely ground feed.

It would be desirable to have an animal feeder that would dispense only a preselected maximum amount of feed upon a single actuation of a feed dispensing apparatus, that was useful with a wide variety of feed, and that did not rely upon the bridging of the feed over the dispersing slot to stop the feed dispensing.

SUMMARY OF THE PRESENT INVENTION

There is provided in accord with the present invention an animal feeder for dispensing pre-selected maximum quantities of feed upon a single actuation of a feed dispensing apparatus. The feeder has a storage bin having a pair of opposed, spaced apart side walls and a pair of opposed, spaced apart front and rear walls, the walls defining therebetween a storage volume for holding the animal feed. The bin includes a dispensing opening extending between the lower edges of the front and rear walls, which are angularly inclined downwardly and inwardly towards each other to provide a converging chute to facilitate the downward flow of the entire feed ration through the slot under the influence of gravity.

The animal self feeder further includes a gate swingable between open and closed positions and a feed charge chamber swingable with the door to receive a charge of feed when the door is swung open and to dispense the charge of feed for animal consumption when the door has substantially returned to its closed position. The swingable gate is normally biased by gravity in the closed position and is swingable to the open position by a lever rigidly attached to the gate. The gate is swingable about a pivot axis extending between the sidewalls, with the pivot axis being disposed closely adjacent one of the pair of opposed front and rear walls.

In a preferred embodiment, the animal feeder includes a feed trough to receive the feed as it is dispensed, the feed trough being disposed below the dispensing opening. In the preferred embodiment the gate and lever form a one piece structure bent to form two diverging arms and mounted between the side walls so as to pivot around the longitudinal axis defined by the bend. The charge chamber is formed between the arms in the preferred embodiment.

The foregoing objects of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE PRESENT INVENTION

Figure 3:
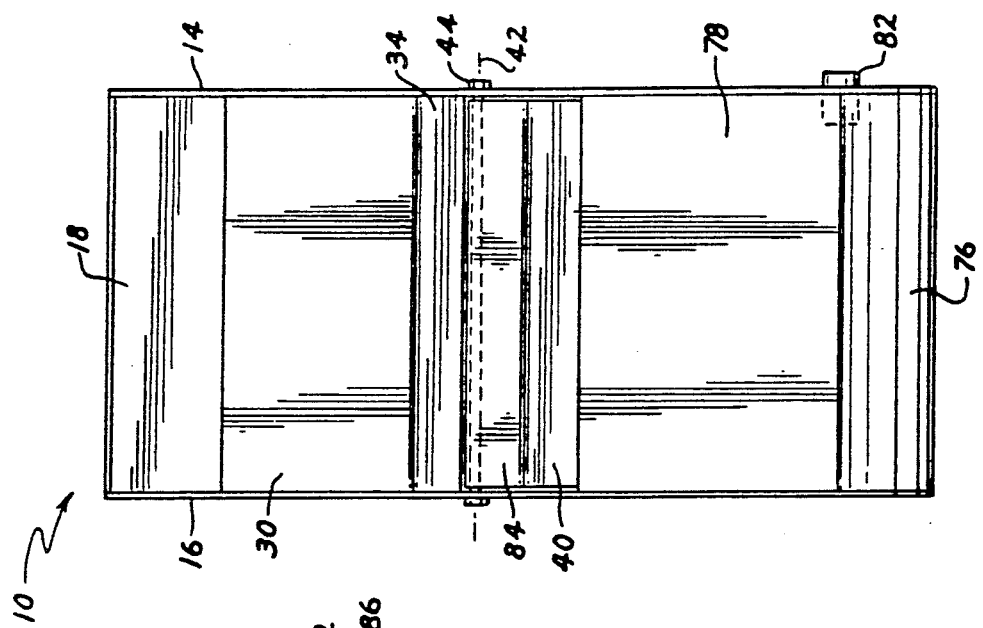
FIG. 3 shows the animal feeder of FIG. 1 in a rear elevation view.

FIGS. 1-5 show an animal feeder 10 in accordance with the principles of the present invention. Animal feeder 10 includes a storage bin 12 defined by a first pair of spaced apart, substantially planar, opposing side walls 14 and 16 and a second pair of opposing front and rear walls 18 and 20 respectively for storing animal feed 22, best seen in FIGS. 4 and 5. Bin 12 includes an open top 24 for filling bin 12 with feed and a dispensing opening 26 disposed in the bottom of bin 12. Opening 26 has a substantially rectangular configuration in the embodiment shown and is defined by the gaps between side walls 14 and 16 and front and rear walls 18 and 20 respectively.

Figure 4:
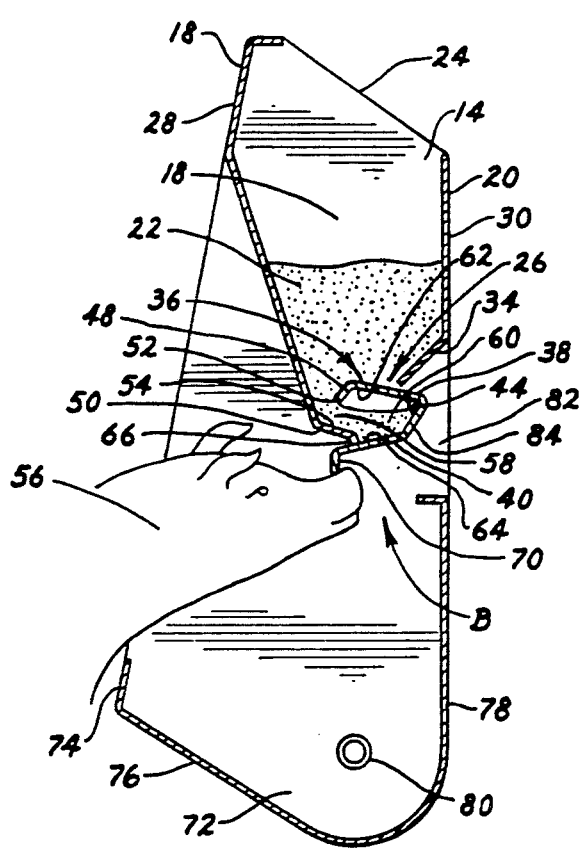
FIG. 4 is a cross-sectional side elevation view of the animal feeder of FIG. 1 taken along cutting planes 4—4 and showing the swingable gate in an open position.
Figure 5:
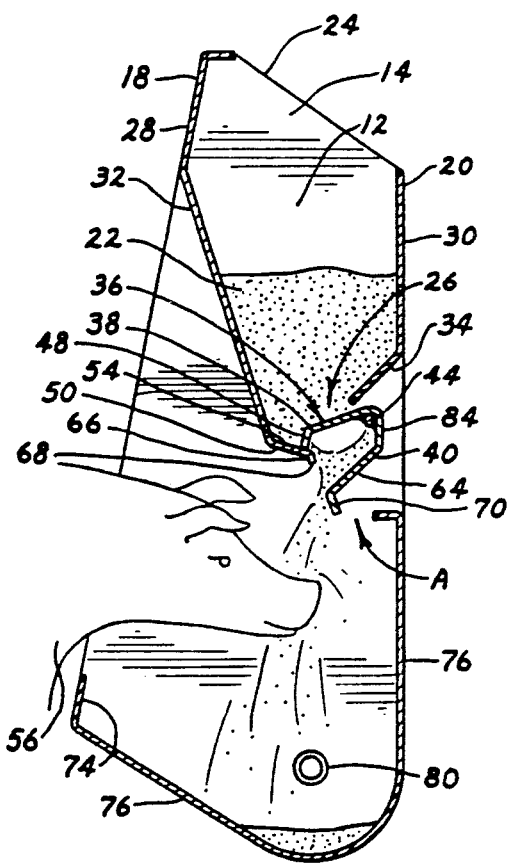
FIG. 5 is a cross-sectional side elevation view of the animal feeder in FIG. 1 taken from the same viewing plane as FIG. 4 but showing the swingable gate in the closed position.

As best shown in FIGS. 4 and 5, front and rear walls 18 and 20 both include a generally upright wall portion 28, 30 respectively, and an inclined portion 32 and 34, respectively. Inclined wall portions 32 and 34 are angled downwardly towards the interior of bin 12 to provide a converging bin structure or chute in the bottom portion thereof, with the inclined interior surfaces of wall portions 32 and 34 directing the feed towards bin dispensing opening 26 as it is dispensed.

Figure 1:
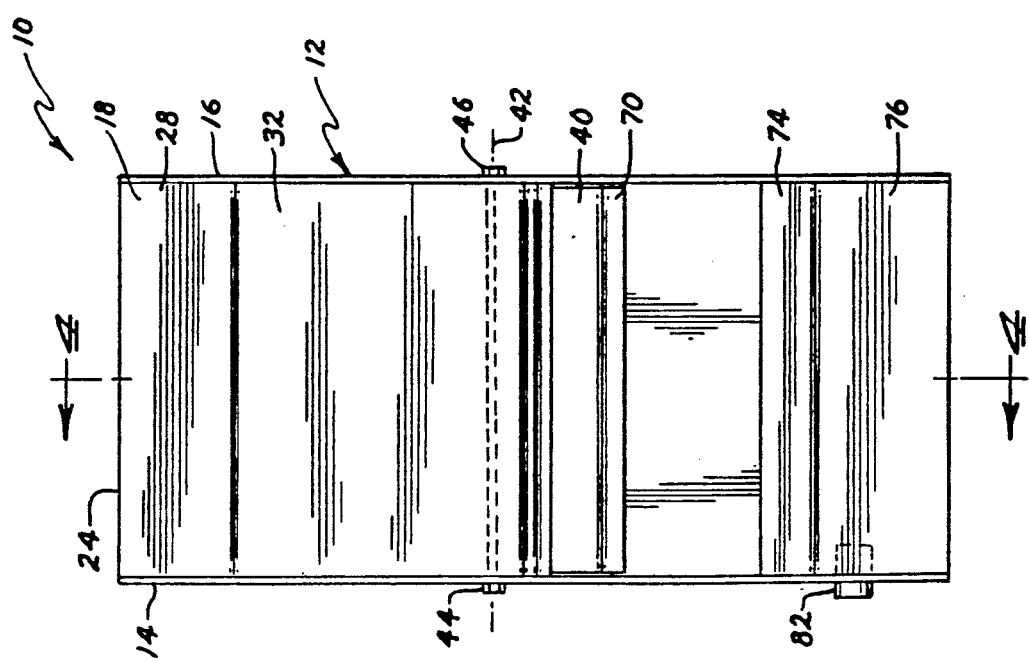
FIG. 1 is a front elevation view of an animal feeder in accordance with the present invention.

Referring still to FIGS. 4 and 5, dispensing opening 26 is closed by a swingable gate 36. Gate 36 comprises a one piece structure bent to form two diverging upper and lower arms 38 and 40. Swingable gate 36 is pivotally attached between side walls 14 and 16 and pivots around a pivot axis 42 (FIGS. 1 and 3). As shown in FIGS. 1, 3 and 4, gate 36 may be welded to a pair of pins 44 and 46 loosely received within mutually opposing holes in side walls 14 and 16 respectively. If desired, a continuous rod may be used rather than pins 44 and 46, the rod extending the entire distance from side wall 14 to side wall 16 and secured therein. Upper and lower arms 38 and 40 are bent along a bend axis that is substantially coincident with pivot axis 42.

As seen in FIG. 5, upper arm 38 of swingable gate 36 substantially closes dispensing opening 26 when swingable gate 36 is disposed in the closed position A as shown in that Figure. Position A is the normal position for gate 36, with the arms 38 and 40 providing a downward moment such that gate 36 is biased in a closed position by gravity. Gate 36 swings between closed position A and open position B as shown in FIG. 4. Gate 36 is prohibited from swinging downward such that upper and lower arms 38 and 40 are substantially vertical by an interference between upper arm 38 and inclined wall portion 32 of front wall 18. As shown in FIG. 5, this interference occurs between a flange 48 extending outwardly and substantially downwardly from upper arm 38 and a slightly inclined, inward extension 50 of inclined wall portion 32. Thus, when the edge 52 of flange 48 contacts the upper surface 54 of wall extension 50, swingable gate 36 will have closed opening 26 and prohibited animal feed 22 from falling downwardly through the opening under the influence of gravity.

Referring now to FIG. 4, an animal 56, in this case a hog, is shown engaging lower arm 40 with its snout and lifting upward thereon so as to pivot swingable gate 36 about its pivot axis 42 and to create a gap 58 between flange edge 52 and upper surface 54. Animal feed flows through this gap 58 into a charge chamber 60 formed between the lower surface 62 of upper arm 38 and the upper surface 64 of lower arm 40. The charge chamber accepts a certain preselected maximum amount of feed depending upon the dimensions thereof for delivery and dispensing to the animal. The upward pivoting of swingable gate 36 is limited by the interference between upper surface 64 of lower arm 40 and its engagement with wall extension 50. If desired, wall extension 50 may include a downwardly extending flange member 66 having an edge 68 engagable by upper surface 64. The gap between edge 68 and upper surface 64 when gate 36 is closed as shown in FIGS. 5 is on the order of one and one-quarter inches (1¼"). Additionally, lower arm 40 may also include a downwardly angling flange portion 70 engagable by the animal 56. Lower arm 40 is of such a length in a direction extending forwardly from pivot axis 42 as to insure contact thereof with flange member 66 of wall extension 50 when gate 36 is lifted upwardly by a hogs snout. Thus, in the open gate position of FIG. 4, lower arm 40 extends forwardly towards the front side of the feeder beyond flange member 66.

As shown in FIG. 4, with the gate 36 fully opened, feed is unable to be dispensed from storage bin 12 or charge chamber 60 because of the interference between lower arm 40 and front wall portion 50. As animal 56 disengages from lower arm 40, swingable gate 36 will swing downward under the force of gravity. Flange 48 will act as a knife edge slicing through the animal feed within gap 58 to close off any flow of animal feed therethrough. Lower arm 40 will simultaneously pivot downward and provide a slanted delivery chute in the inclined position shown in FIG. 5 for dispensing of the feed from within charge chamber 60. In this way, a preselected, maximum amount of feed is dispensed each time gate 36 is pivoted upwardly and then released The greater length of lower arm 40, and thus its greater weight with respect to upper arm 38 insures gravity closing of the gate 36 about pivot axis 42. The weight of feed in storage bin 12 acting on gate 36 will also assist in forcing it down to its closed position.

The present invention may further include a trough means 72 disposed below dispensing opening 26 to receive the feed as it is dispensed. Trough means 72 holds the feed within a confined area and substantially prevents animal wastage of the food. Trough means 72 is defined by front, bottom and rear walls, 74, 76, and 78 respectively, which as shown, may comprise a single piece of appropriately shaped material. An access opening for an animal's head is provided on the front side of the feeder between the upper edge of wall 74 and lower arm 40. Dispensing opening 26 and gate 36 are located above the animal access opening and towards the rear side of the feeder so that the animal can easily reach and actuate gate 36. A water nipple 80 of known design and construction may be included in trough portion 72, whereby the feeding apparatus may serve as a wet or dry feeder.

If desired, rear wall 20 may be integral with rear wall 78. In the embodiment shown however, a viewing opening 82 (best seen in FIG. 4) is created between the lower end of upright wall portion 30 and the upper end of wall 76 to allow an individual the opportunity to view and observe the feed consumption of the animal.

With the present embodiment as shown in FIGS. 1 through 5, an animal such as animal 56 can actuate the feed dispensing mechanism and receive preselected maximum amounts of feed with each actuation. Swingable gate 36 is disposed so that each time gate 36 is actuated, upper arm 38 is pivoted upwardly into the animal feed 22 thereby agitating the feed and preventing it from bridging and not dispensing. In the embodiment shown, lower arm 40 includes a generally upwardly directed wall portion 84. Wall portion 84 by its height defines the spacing between surfaces 62 and 64 of upper and lower arms 38 and 40 respectively, and thus partially defines the size of charge chamber 60. In the embodiment shown, surfaces 62 and 64 are approximately 25° apart.

Figure 2:
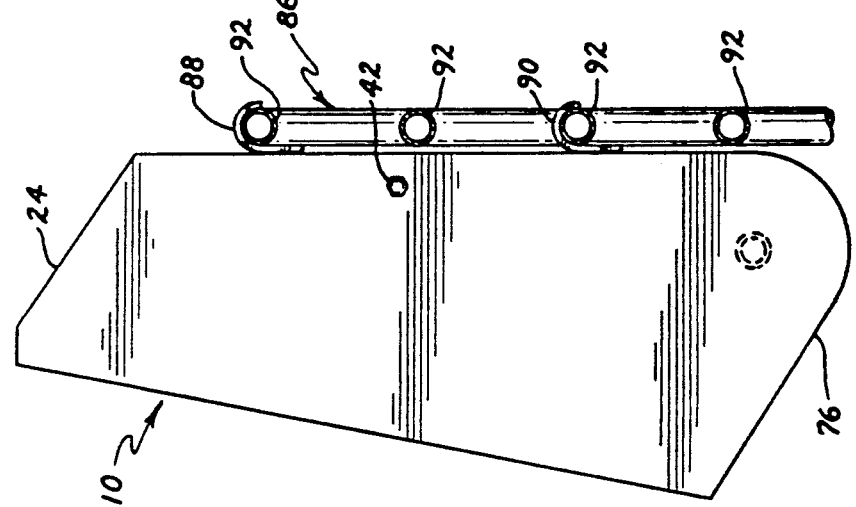
FIG. 2 is a side elevation view of the animal feeder shown in FIG. 1.

As shown in FIG. 2, animal feeder 10 may be hung off a fence 86 such as a fence forming a portion of a farrowing stall. Thus, feeder 10 may include a pair of upper and lower brackets 88 and 90 by which feeder 10 may be hung over the horizontal fence bars 92 forming part of fence 86.

Figure 6:
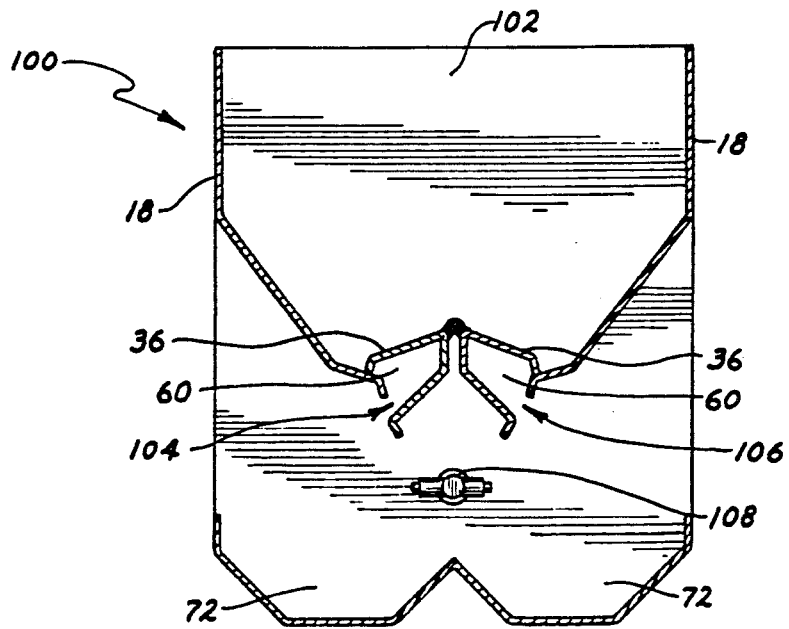
FIG. 6 is a cross-sectional side elevation view showing a dual animal feeder accessible from opposite sides thereof in accordance with the present invention.

FIG. 6 shows an embodiment of the present invention useful for feeding two animals from opposing sides thereof. Thus, as shown in the Figure, a dual animal feeder 100 includes a storage bin 102 having a pair of dispensing openings 104 and 106 each closed by a swingable gate 36 in accord with the present invention. Both gates 36 shown in FIG. 6 are hinged along the same pivot axis and are independently openable and closable. This may be accomplished by a door hinge type of pivot mounting, with gates 36 having interleaved hinge sleeves pivotally supported on a pivot rod 107 extending between the side walls of the feeder. Each gate 36 dispenses a single charge from its respective charge chamber 60 into a trough means 72 disposed therebelow. Dual animal feeder 100 may include a dual water dispensing nipple 108 to provide access to both animals. Feeder 100 may include a central wall 110 shown in phantom for dividing bin 102 into two smaller bins to control the distribution of the feed dispensing between openings 104 and 106.

The present invention thus described provides a feed dispensing mechanism wherein the dispensing mechanism is actuated by an animal to be fed to transfer feed from a storage bin to an intermediate storage chamber from which it is dispensed to the animal for feeding. Thus use of the intermediate storage chamber enables the animal to provide a self controlled distribution and dispensing of feed from the storage bin, unlike prior art dispensing mechanisms which dispense food directly from the storage bin into a feed trough. The use of the intermediate storage chamber inhibits large scale, continuous dispensing of the feed by an animal and thus inhibits wastage of the feed by the animal.

The present invention having thus been described, other modifications, alterations, or substitutions may now suggest themselves to those skilled in the art, all of which are within the spirit and scope of the present invention. It is therefore intended that the present invention be limited only by the scope of the attached claims below.

What is claimed is:

1. An animal actuated, feed dispensing apparatus comprising:

a feed storage bin having a bottom opening for dispensing feed from said bin;

gate means swingable between closed and open positions and mounted on said bin to permit opening and closing of said bottom opening, said gate means normally disposed in said closed position;

a feed charge chamber for receiving a predetermined charge of feed from said bin through said opening when said gate means is swung to said open position and for discharging said feed into an animal feeding area when said gate means is swung to said closed position, said feed charge chamber being carried on said gate means for movement therewith; and means engagable by an animal for swinging said gate means between said closed and open positions, whereby an animal can engage said means for swinging so said gate means swing from said closed to said open position so that said feed charge chamber can receive a charge of feed from said bin and whereby the animal can dispense said charge of feed by disengaging from said means for swinging so said gate means swings to said closed position and said feed is discharged from said feed charge chamber.

2. The apparatus of claim 1 and further including a feed trough for receiving the feed charge, said trough being disposed below said bin.

3. The apparatus of claim 1 wherein said bottom opening extends generally horizontally and said gate means is swingably supported on pivot means secured to said bin and comprises first and second plate-like members, said first member extending across said bottom opening in closing relation thereto when said gate means is in said closed position, said members being angularly joined together along one edge thereof defining a pivot axis extending horizontally, about which said gate means is swingable on said pivot means, and wherein said charge chamber is partially defined between the lower surface of said first member and the upper surface of said second member.

4. The apparatus of claim 3 wherein said second member includes said means for swinging.

5. The apparatus of claim 3 wherein said gate means is moved to said open position from said closed position by the animal engaging said second member and lifting thereon so as to swing said gate means to said open position.

6. The apparatus of claim 3 wherein said bin includes spaced apart opposing side walls and spaced apart opposing front and rear walls, wherein at least one wall of one of said opposing front and rear walls tapers downwardly and inwardly toward the opposing front or rear wall, said opening being partially defined by lower edge of said tapering wall and a lower edge of said other opposing front or rear wall, and said opening extending generally horizontally in a direction between said opposing side walls.

7. The apparatus of claim 6 wherein said pivot axis is adjacent to one of said front and rear walls and said first member engages the other one of said front or rear walls when said gate means is in said closed position.

8. The apparatus of claim 7 wherein said closed position is partially defined by the interference of said first member with said other one wall and said open position is defined by the interference of said second member and said other one wall.

9. The apparatus of claim 7 wherein said first member includes a depending flange on the free end thereof extending downwardly from said first member, said flange engaging said other one wall when said gate means is in said closed position.

10. The apparatus of claim 3 wherein said plate-like members are so sized and pivotally supported on said pivot means that said gate means is normally biased to said closed position by the force of gravity.

* * * * *